US011531233B2

(12) United States Patent
Wang et al.

(10) Patent No.: US 11,531,233 B2
(45) Date of Patent: Dec. 20, 2022

(54) LIGHT CONVERSION STRUCTURE, BACKLIGHT MODULE, COLOR FILTER SUBSTRATE AND DISPLAY DEVICE

(71) Applicants: BEIJING BOE DISPLAY TECHNOLOGY CO., LTD., Beijing (CN); BOE TECHNOLOGY GROUP CO., LTD., Beijing (CN)

(72) Inventors: Ruiyong Wang, Beijing (CN); Yang You, Beijing (CN); Ruizhi Yang, Beijing (CN); Yun Qiu, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/832,893

(22) Filed: Jun. 6, 2022

(65) Prior Publication Data

US 2022/0308401 A1    Sep. 29, 2022

Related U.S. Application Data

(63) Continuation of application No. 16/338,764, filed as application No. PCT/CN2018/106000 on Sep. 17, 2018, now Pat. No. 11,353,749.

(30) Foreign Application Priority Data

Oct. 16, 2017    (CN) .......................... 201710959492.0

(51) Int. Cl.
*G02F 1/13357*        (2006.01)
(52) U.S. Cl.
CPC .............................. *G02F 1/133617* (2013.01)

(58) Field of Classification Search
CPC ................................................ G02F 1/133617
See application file for complete search history.

(56) References Cited

U.S. PATENT DOCUMENTS 10,634,946 B2 *    4/2020    Cheng ................... G02F 1/1336
2002/0190639 A1    12/2002    Yamada
(Continued)

FOREIGN PATENT DOCUMENTS

CN        103676288 A        3/2014
CN        105425540 A        3/2016
(Continued)

OTHER PUBLICATIONS

International Search Report and Written Opinion in corresponding International Patent Application No. PCT/CN2018/106000 dated Dec. 19, 2018. 16 pages.
(Continued)

*Primary Examiner* — Evan P Dzierzynski
(74) *Attorney, Agent, or Firm* — Leason Ellis LLP

(57)  ABSTRACT

A light conversion structure applied to a display device, and a backlight module, a color filter substrate, and a display device including the light conversion structure are provided. The light conversion structure includes a light filter structure (100) including a first optical film layer (110) and a second optical film layer (120) which are alternately arranged and attached to each other in a total number of N, N is an even number, one of a surface (111) of the first optical film layer (110) far away from the second optical film layer (120) and a surface (121) of the second optical film layer (120) far away from the first optical film layer (110) is a light incident surface (1001) of the light filter structure (100), and the other one is a light-exiting surface (1003). A part of the incident light (101) of first color that is reflected by the light incident surface (1001) is a first reflected light (102), a part of the incident light (101) of first color that is reflected by an
(Continued)

interface (1002) between the first optical film layer (110) and the second optical film layer (120) is a second reflected light (103), and an optical path difference between the first reflected light (102) and the second reflected light (103) is an integer multiple of a wavelength of the incident light (101) of first color. The light conversion structure can reflect a part of the incident light of first color to allow the incident light of first color to be reused, thereby improving a utilization of a light-emitting material in the display device.

16 Claims, 5 Drawing Sheets

(56) References Cited

U.S. PATENT DOCUMENTS

| | | |
|---|---|---|
| 2012/0248474 A1 | 10/2012 | Ebihara |
| 2013/0021560 A1 | 1/2013 | Wang et al. |
| 2015/0219965 A1 | 8/2015 | Dong et al. |
| 2016/0377786 A1* | 12/2016 | Ham ............... G02B 6/0055 349/65 |
| 2017/0194530 A1 | 7/2017 | Zhou et al. |
| 2017/0242292 A1 | 8/2017 | Jeon et al. |
| 2017/0307936 A1 | 10/2017 | Tseng et al. |
| 2018/0039131 A1* | 2/2018 | Szwarcman ......... G03F 7/0007 |
| 2018/0231827 A1 | 8/2018 | Choi et al. |
| 2018/0252962 A1 | 9/2018 | Jiang et al. |
| 2018/0299727 A1 | 10/2018 | Fan |

FOREIGN PATENT DOCUMENTS

| | | |
|---|---|---|
| CN | 106681055 A | 5/2017 |
| CN | 107045226 A | 8/2017 |
| CN | 107505767 A | 12/2017 |

OTHER PUBLICATIONS

Non-Final Office Action for related U.S. Appl. No. 16/388,764, dated Oct. 29, 2021. 9 pages.

Notice of Allowance for related U.S. Appl. No. 16/388,764, dated Feb. 7, 2022. 9 pages.

* cited by examiner

LIGHT CONVERSION STRUCTURE, BACKLIGHT MODULE, COLOR FILTER SUBSTRATE AND DISPLAY DEVICE

This application is a Continuation of U.S. application Ser. No. 16/338,764, filed on Apr. 2, 2019, which is a U.S. National Stage Application under 35 U.S.C. § 371 of International Patent Application No. PCT/CN2018/106000, filed Sep. 17, 2018, which claims the benefit of priority of Chinese Patent Application No. 201710959492.0 filed on Oct. 16, 2017, both of which are incorporated by reference in their entireties as part of the present application.

TECHNICAL FIELD

At least one embodiment of the present disclosure relates to a light conversion structure applied to a display device, and a backlight module, a color filter substrate and a display device including the light conversion structure.

BACKGROUND

Currently, more and more displays use a quantum dot color filter instead of a traditional color filter. Quantum Dot (QD) can also be referred to as nanocrystal, and has a particle size generally in the range of 1-20 nm. Because electrons and holes are subjected to quantum confinement, the quantum dot is converted from a continuous energy band structure to a discrete energy level structure with molecular characteristics and can emit light of a color different from that of an excitation light after being excited. The quantum dot can provide large color gamut and good color saturation, which can improve an image quality.

SUMMARY

At least one embodiment of the present disclosure provides a light conversion structure, and a backlight module, a color filter substrate and a display device including the light conversion structure.

At least one embodiment of the present disclosure provides a light conversion structure applied to a display device, including: a light filter structure including a first optical film layer and a second optical film layer which are alternately arranged and attached to each other, a total number of the first optical film layer and the second optical film layer being N, wherein N is an even number, and a refractive index of the first optical film layer is greater than that of the second optical film layer, one of a surface of the first optical film layer far away from the second optical film layer and a surface of the second optical film layer far away from the first optical film layer is a light incident surface of the light filter structure, and the other one of the surface of the first optical film layer far away from the second optical film layer and the surface of the second optical film layer far away from the first optical film layer is a light-exiting surface of the light filter structure; a part of incident light of first color that is reflected by the light incident surface is a first reflected light, a part of the incident light of first color that is reflected by an interface between the first optical film layer and the second optical film layer is a second reflected light, and an optical path difference between the first reflected light and the second reflected light is an integer multiple of a wavelength of the incident light of first color.

For example, a part of the incident light of first color that is reflected by a side of the light-exiting surface facing the interface is a third reflected light, and an optical path difference between the first reflected light and the third reflected light is an integer multiple of the wavelength of the incident light of first color.

For example, the light filter structure includes one pair of first optical film layer and second optical film layer, the light incident surface is a surface of the second optical film layer far away from the first optical film layer, the first optical film layer has a refractive index of n1 and a thickness of d1, and the second optical film layer has a refractive index of n2 and a thickness of d2, the incident light of first color has a wavelength of $\lambda$, and the incident light of first color satisfies the following formulas upon being incident into the light filter structure:

$$2n_2d_2 = 2k^*(\lambda/2), k=1,2,3\ldots;$$

$$2n_2d_2 + 2n_1d_1 - (\lambda/2) = 2k'^*(\lambda/2), k'=1,2,3\ldots;$$

$$4n_2d_2 = 2k''^*(\lambda/2), k''=1,2,3\ldots.$$

For example, the light filter structure includes one pair of first optical film layer and second optical film layer, the light incident surface is a surface of the first optical film layer far away from the second optical film layer, the first optical film layer has a refractive index of $n_1$ and a thickness of $d_1$, and the second optical film layer has a refractive index of $n_2$ and a thickness of $d_2$, the incident light of first color has a wavelength of $\lambda$, and the incident light of first color satisfies the following formulas upon being incident into the light filter structure:

$$2n_1d_1 - (\lambda/2) = 2k^*(\lambda/2), k=1,2,3\ldots;$$

$$2n_1d_1 + 2n_2d_2 = 2k'^*(\lambda/2), k'=1,2,3\ldots;$$

$$4n_1d_1 - 3(\lambda/2) = 2k''^*(\lambda/2), k''=1,2,3\ldots.$$

For example, the incident light of first color has a wavelength in the range from 440 nm to 465 nm.

For example, both of the first optical film layer and the second optical film layer have a refractive index in the range from 1.2 to 1.8.

For example, both of the first optical film layer and the second optical film layer have a thickness in the range from 20 nm to 5000 nm.

For example, both of the first optical film layer and the second optical film layer are made of at least one material selected from the group consisting of a siloxane added with a titanium oxide particle and an organic resin added with a titanium oxide particle.

For example, the light conversion structure applied to a display device further includes: a light conversion layer configured to transmit a part of the incident light of first color, and to allow another part of the incident light of first color light to exit as light of at least one other color upon passing through the light conversion layer; a wavelength of the incident light of first color is less than a wavelength of light of the other color; the light filter structure is on a light-exiting side of the light conversion layer.

For example, the light conversion layer includes a quantum dot material or a fluorescent material.

At least one embodiment of the present disclosure provides a backlight module, including a light source and a light conversion structure applied to a display device according to any one of the above embodiments, the light conversion structure is located on a light-exiting side of the light source, light emitted from the light source is the incident light of first color.

For example, the light conversion layer includes a quantum dot material.

For example, the quantum dot material is a mixed quantum dot material, and the mixed quantum dot material includes a mixture of a quantum dot material of second color and a quantum dot material of third color to allow the incident light of first color to exit as light of second color and light of third color upon passing through the light conversion layer.

For example, the backlight module further includes: a light adjustment structure on a side of the light conversion structure far away from the light source to extract light uniformly.

At least one embodiment of the present disclosure provides a color filter substrate including the light conversion structure applied to a display device according to any one of the above embodiments, the light conversion structure further includes a color filter layer located on a light incident side of the light filter structure, the color filter layer includes a light conversion portion and a light transmission portion, the light transmission portion is configured to directly transmit the incident light of first color, the light conversion portion is configured to allow the incident light of first color to exit as light of at least one other color upon passing through the light conversion portion, a wavelength of the incident light of first color is smaller than a wavelength of the light of other color, and the light conversion portion includes a quantum dot material.

For example, the quantum dot material includes a quantum dot material of second color and a quantum dot material of third color to allow the incident light of first color to exit as light of second color and light of third color upon passing through the light conversion portion.

For example, the light filter structure includes a hollowed-out structure, and an orthographic projection of the hollowed-out structure on the color filter layer falls within an orthographic projection of the light transmission portion on the color filter layer.

At least one embodiment of the present disclosure provides a display device including the light conversion structure applied to a display device according to any one of the above embodiments.

BRIEF DESCRIPTION OF THE DRAWINGS

In order to clearly illustrate the technical solutions of the embodiments of the present disclosure, the drawings of the embodiments will be briefly described in the following; it is obvious that the described drawings are only related to some embodiments of the present disclosure without constituting any limitation thereto.

DETAILED DESCRIPTION

Figure 1A:
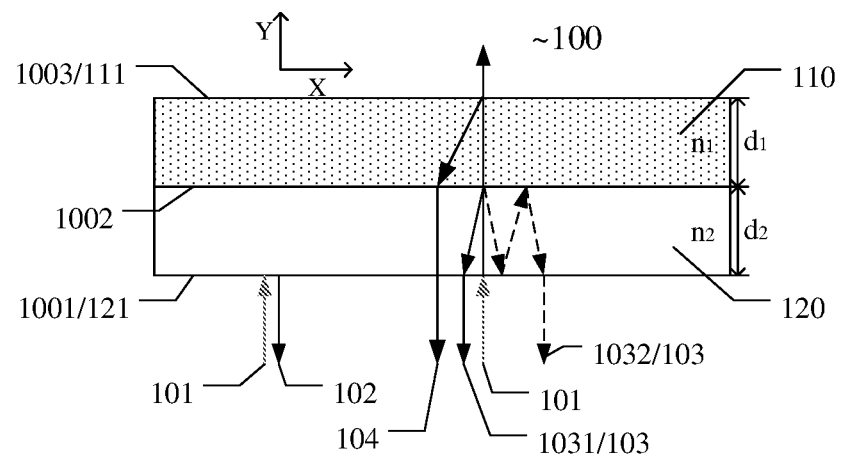
FIG. 1A is a schematic diagram illustrating a light filter structure and a working principle thereof in a light conversion structure according to an example of an embodiment of the present disclosure.

In order to make objects, technical details and advantages of the embodiments of the present disclosure apparent, the technical solutions of the embodiments will be described in a clearly and fully understandable way in connection with the drawings related to the embodiments of the present disclosure. Apparently, the described embodiments are just a part but not all of the embodiments of the present disclosure. Based on the described embodiments herein, those skilled in the art can acquire other embodiment(s), without any inventive work, which should be within the protection scope of the present disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. "On," "under," "right," "left" and the like are only used to indicate relative position relationship, and when the position of the object which is described is changed, the relative position relationship may be changed accordingly.

In the study, the inventor(s) of the present application noticed the problems existed in a display device using a quantum dot (QD) color filter that, the quantum material has a concentration limit which is hard to be increased, the efficiency of quantum conversion is poor, and it's unable to be matched with a color filter in thickness, and the like.

Embodiments of the present disclosure provide a light conversion structure applied to a display device, and a backlight module, a color filter substrate, and a display device including the light conversion structure. A light conversion structure applied to a display device according to an embodiment of the present disclosure includes a light filter structure including a first optical film layer and a second optical film layer which are alternately arranged and attached to each other, a total number of the first optical film layer and the second optical film layer is N, N is an even number; and a refractive index of the first optical film layer is greater than that of the second optical film layer; one of a surface of the first optical film layer far away from the second optical film layer and a surface of the second optical film layer far away from the first optical film layer is a light incident surface of the light filter structure, and the other one of the surface of the first optical film layer far away from the second optical film layer and the surface of the second optical film layer far away from the first optical film layer is a light-exiting surface of the light filter structure; a part of incident light of first color that is reflected by the light incident surface is a first reflected light, a part of the incident light of first color that is reflected by an interface between the first optical film layer and the second optical film layer is a second reflected light, and an optical path difference between the first reflected light and the second reflected light is an integer multiple of a wavelength of the incident light of first color. The light conversion structure can reflect a part of the incident light of first color to allow the incident light of first color to be reused, thereby improving a utilization of a light-emitting material in the display device.

A light conversion structure applied to a display device, and a backlight module, a color filter substrate and a display device including the light conversion structure, provided by the embodiment of the present disclosure, will be described below with reference to the accompanying drawings.

An embodiment of the present disclosure provides a light conversion structure applied to a display device. FIG. 1A is a schematic diagram illustrating a light filter structure and a working principle thereof in a light conversion structure provided by an example of an embodiment of the present disclosure. As illustrated in FIG. 1A, the light filter structure 100 includes a first optical film layer 110 and a second optical film layer 120 which are alternately arranged and attached to each other, and a total number of the first optical film layer 110 and the second optical film layer 120 is N. A refractive index $n_1$ of the first optical film layer 110 is greater than a refractive index $n_2$ of the second optical film layer 120. FIG. 1A is described with reference to the case where the light filter structure 100 includes one pair of first optical film layer and second optical film layer arranged in a stacked manner, and mediums on both sides of the pair of first optical film layer and second optical film layer in a Y direction each have a refractive index smaller than that of the first optical film layer 110 and the second optical film layer 120, by way of example. One of a surface 111 of the first optical film layer 110 far away from the second optical film layer 120 and a surface 121 of the second optical film layer 120 far away from the first optical film layer 110 is an light incident surface 1001 of the light filter structure 100, and the other one is a light-exiting surface 1003 of the light structure 100. A part of incident light 101 of first color that is reflected by the light incident surface 1001 is a first reflected light 102, and a part of the incident light 101 of first color that is reflected by an interface 1002 between the first optical film layer 110 and second optical film layers 120 is a second reflected light 103, and an optical path difference between the first reflected light 102 and the second reflected light 103 is an integral multiple of a wavelength of the incident light 101 of first color. The light filter structure provided by the embodiment of the present disclosure can partly reflect the incident light of first color, and the first reflected light in the reflected light is in constructive interference with the second reflected light in the reflected light so that a reflection of the incident light of first color is improved.

The light-exiting surface herein refers to a surface where most of the incident light of first color exits from the light filter structure, and the light-exiting surface and the light incident surface are two surfaces arranged in parallel.

FIG. 1A is described with reference to the case where the surface 121 of the second optical film layer 120 far away from the first optical film layer 110 is served as the light incident surface 1001 of the light filter structure 100, the interface 1002 is an interface between the second optical film layer 120 and the first optical film layer 110 when the incident light 101 of first color is incident onto the first optical film layer 110 from the second optical film layer 120, and the incident light 101 of first color is perpendicularly incident onto the light incident surface 1001 (that is, the incident light 101 of first color propagates in the Y direction), by way of example. It should be explained that a path of the reflected light is schematically shifted in FIG. 1A in order to clearly illustrate several paths of the reflected light of the incident light of first color. In fact, in the case where the incident light 101 of first color is perpendicularly incident onto the light incident surface 1001, the reflected light propagates in a direction opposite to the Y direction, and the reflected light returns along a path of the incident light.

For example, as illustrated in FIG. 1A, upon being incident onto the light incident surface 1001, the incident light 101 of first color is transmitted and reflected, respectively, and the part of the incident light 101 of first color that is reflected by the light incident surface 1001 is the first reflected light 102. The part of the incident light 101 of first color that is transmitted to the second optical film layer 120 is transmitted and reflected, respectively, again, upon being incident onto the interface 1002, and the part of the incident light 101 of first color that is reflected by the interface 1002 for one time is the second reflected light 1031 (hereinafter, "the second reflected light 1031" refers to the part of the incident light 101 of first color that is reflected by the interface 1002 for one time); while the part of the incident light 101 of first color that is transmitted to the first optical film layer 110 has a portion which would exit from the light-exiting surface 1003, and has another portion which would be reflected by a side of the light-exiting surface 1003 facing the interface 1002, that is, the third reflected light 104.

For example, a thickness of the second optical film layer 120 is $d_2$, and a wavelength of the incident light 101 of first color is $\lambda$, then an optical path difference between the first reflected light 102 and the second reflected light 1031 satisfies a formula of $\Delta 1 = 2n_2 d_2$. Because the optical path difference between the first reflected light 102 and the second reflected light 1031 is an integral multiple of the wavelength of the incident light 101 of first color, that is, $\Delta 1 = 2n_2 d_2 = 2k^*(\lambda/2)$, $k=1, 2, 3 \ldots$, the first reflected light 102 is in constructive interference with the second reflected light 1031, that is, a light intensity obtained by the first reflected light 102 being in interference with the second reflected light 1031 is a maximum value, so that a reflection effect of the light filter structure to the incident light of first color is enhanced.

For example, as illustrated in FIG. 1A, an optical path difference between the first reflected light 102 and the third reflected light 104 satisfies a formula of $\Delta 2 = 2n_2 d_2 + 2n_1 d_1 - (\lambda/2)$; because the refractive index of the first optical film layer 110 is greater than the refractive indices of the mediums on both sides of the first optical film layer 110 in the Y direction, an additional optical path difference caused by a half wave loss when the incident light 101 of first color is reflected by the side of the light-exiting surface 1003 facing the interface 1002 should also be taken into account. Because the optical path difference between the first reflected light 102 and the third reflected light 104 is an integral multiple of the wavelength of the incident light 101 of first color, that is, $\Delta 2 = 2n_2 d_2 + 2n_1 d_1 - (\lambda/2) = 2k'^*(\lambda/2)$, $k'=1, 2, 3 \ldots$, the first reflected light 102 is in constructive interference with the third reflected light 104, that is, a light intensity obtained by the first reflected light 102 being in interference with the third reflected light 104 is a maximum value, so that a reflection effect provided by the light filter structure to the incident light of first color is enhanced.

For example, as illustrated in FIG. 1A, a part of the incident light 101 of first color that is reflected by the interface 1002 between the first optical film layer 110 and the second optical film layer 120 for two times is a second reflected light 1032 (hereinafter, the second reflected light 1032 is also referred to as "the part of the incident light 101 of first color that is reflected by the interface 1002 between the first optical film layer 110 and the second optical film layer 120 for two times), and an optical path difference between the first reflected light 102 and the second reflected light 1032 satisfies a formula of $\Delta 3=4n_2d_2$. Because the optical path difference between the first reflected light 102 and the second reflected light 1032 is an integral multiple of the wavelength of the incident light 101 of first color, that is, $\Delta 3=4n_2d_2=2k''*(\lambda/2)$, k''=1, 2, 3, ..., the first reflected light 102 is in constructive interference with the second reflected light 1032, that is, a light intensity obtained by the first reflected light 102 being in constructive interference with the second reflected light 1032 is a maximum value, so that a reflection effect provided by the light filter structure to the incident light of first color is enhanced.

Therefore, the incident light of first color, upon passing through the light filter structure provided by this embodiment, generates both of transmitted light and reflected light, and the transmitted light exits from the light-exiting surface. The second reflected light obtained by reflecting the incident light of first color at the interface between the first optical film layer and the second optical film layer, and/or, the third reflected light obtained by reflecting the incident light of first color at the side of the light-exiting surface facing the interface, is/are in constructive interference with the first reflected light obtained by reflecting the incident light of first color on the light incident surface, so that a reflection effect provided by the light filter structure to the incident light of first color is enhanced. In this way, a part of the incident light of first color that is reflected by the light filter structure can be reused, so as to improve a utilization of light-emitting material in the display device.

Figure 1B:
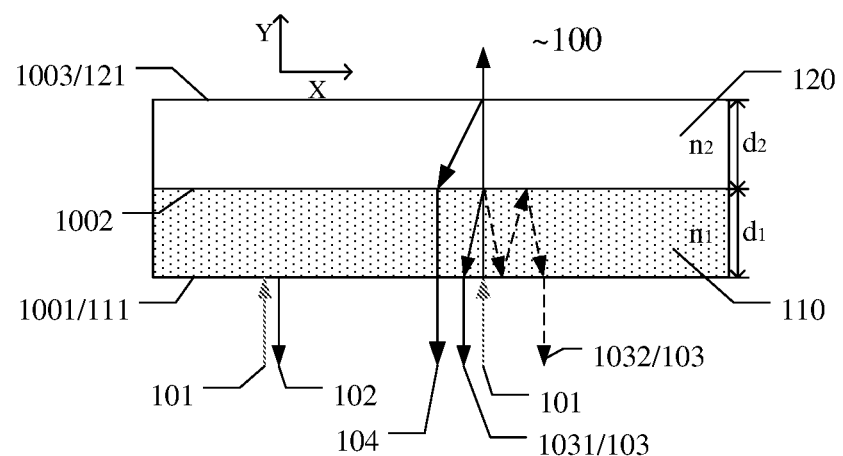
FIG. 1B is a schematic diagram illustrating a light filter structure and a working principle thereof in a light conversion structure according to another example of an embodiment of the present disclosure.

For example, FIG. 1B is a schematic diagram illustrating a light filter structure and a working principle thereof in a light conversion structure provided by another example of an embodiment of the present disclosure. As illustrated in FIG. 1B, FIG. 1B is described with reference to the case where the light filter structure 100 includes one pair of first optical film layer and second optical film layer which are arranged in a stacked manner, and refractive indices of mediums on both sides of the pair of first optical film layer and second optical film layer in the Y direction are all smaller than the refractive indices of the first optical film layer 110 and the second optical film layer 120, by way of example. This example is described with reference to the case where the light incident surface 1001 is a surface 111 of the first optical film layer 110 far away from the second optical film layer 120, by way of example. According to the above analysis, the incident light 101 of first color, upon being incident into the light filter structure 100, satisfies formulas as follows:

$2n_1d_1-(\lambda/2)=2k*(\lambda/2)$, $k=1,2,3\ldots$;

$2n_1d_1+2n_2d_2=2k'*(\lambda/2)$, $k'=1,2,3\ldots$;

$4n_1d_1-3(\lambda/2)=2k''*(\lambda/2)$, $k''=1,2,3\ldots$.

In the above formula derivation, an additional optical path difference caused by a "half wave loss" when the incident light 101 of first color is reflected by the interface 1002 between the first optical film layer 110 and the second optical film layer 120 and is reflected by the interface between the first optical film layer 110 and a medium on a side of the first optical film layer 110 far away from the second optical film layer 120.

For example, when the light filter structure includes a plurality of pairs of first optical film layers and second optical film layers which are arranged in a stacked manner, more formulas are included in the above group of formulas of optical path difference.

Figure 1C:
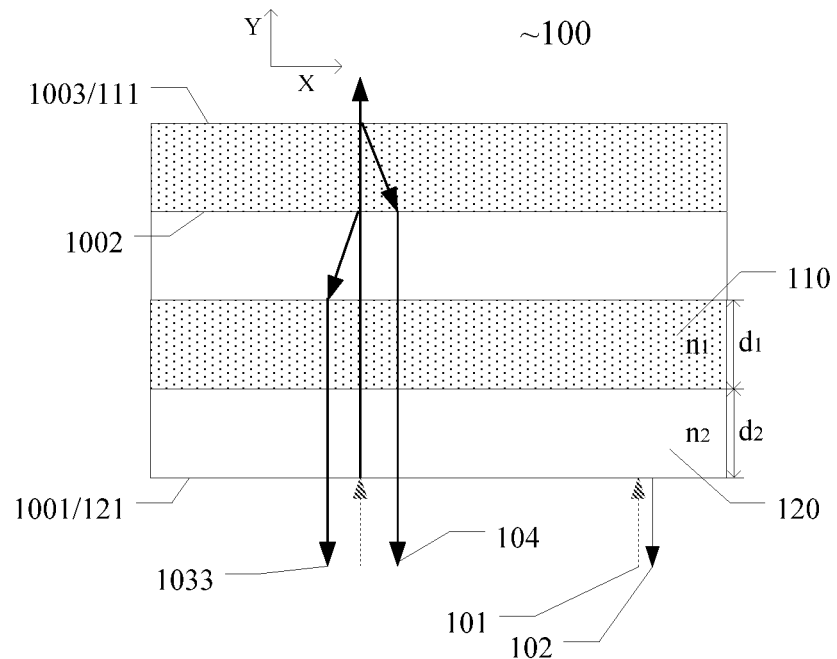
FIG. 1C is a schematic diagram illustrating a light filter structure and a working principle thereof in a light conversion structure according to yet another example of an embodiment of the present disclosure.

For example, FIG. 1C is a schematic diagram illustrating a light filter structure and a working principle thereof in a light conversion structure according to yet another example of an embodiment of the present disclosure. As illustrated in FIG. 1C, FIG. 1C is described with reference to the case where the light filter structure 100 includes two pairs of first optical film layers and second optical film layers which are arranged in a stacked manner, and the refractive indices of the mediums surrounding the first optical film layer 110 and the second optical film layer 120, respectively, are smaller than the refractive indices of the first optical film layer 110 and the second optical film layer 120, by way of example.

This example can be derived according to the principle that the incident light 101 of first color illustrated in FIG. 1A is reflected by the light filter structure 100, which satisfies the following formulas:

$2n_2d_2=2k*(\lambda/2)$, $k=1,2,3\ldots$;

$2n_2d_2+2n_1d^1-(\lambda/2)=2k'*(\lambda/2)$, $k'=1,2,3\ldots$;

$4n_2d_2=2k''*(\lambda/2)$, $k''=1,2,3\ldots$.

It should be explained that, the second formula in the above formulas refers to an optical path difference between the second reflected light obtained by reflecting the incident light 101 of first color at a second interface 1002 (i.e., the second interface in the Y direction) and the first reflected light being an integral multiple of the wavelength of the incident light of first color.

For example, what is different from FIG. 1A is that, this example further includes the case where the incident light 101 of first color is reflected at a third interface 1002 (i.e., the third interface in the Y direction), and in this case, an optical path difference between the second reflected light 1033 obtained by reflecting the incident light 101 of first color at the third interface 1002 and the first reflected light 102 satisfies a formula of $\Delta 4=3n_2d_2+3n_1d_1-(\lambda/2)$.

For example, this example further includes the case where the incident light 101 of first color is reflected at the side of the light-exiting surface 1003 facing the third interface 1002, and in this case, an optical path difference between the third reflected light 104 obtained by reflecting the incident light 101 of first color and the first reflected light 102 satisfies a formula of $\Delta 5=4n_2d_2+4n_1d_1-(\lambda/2)$.

In this example, because the optical path difference between the reflected light (excluding the first reflected light) obtained by reflecting the incident light 101 of first color at the light filter structure 100 and the first reflected light 102 is an integral multiple of the wavelength of the incident light 101 of first color, the optical path differences $\Delta 4$ and $\Delta 5$ also satisfy the following formulas:

$3n_2d_2+3n_1d_1-(\lambda/2)=2k'''*(\lambda/2)$, $k'''=1,2,3\ldots$;

$4n_2d_2+4n_1d_1-(\lambda/2)=2k''''*(\lambda/2)$, $k''''=1,2,3\ldots$.

The above formulas are only several main formulas in the case where the light filter structure includes only two pairs of first optical film layers and second optical film layers, and there may be other formulas which are not enumerated here but can be deduced based on the previous analysis process.

In the case where the light filter structure includes more than two pairs of first optical film layers and second optical film layers, the formula that the incident light of first color satisfies can be derived according to the above deducing process, without enumerated here.

Figure 1D:
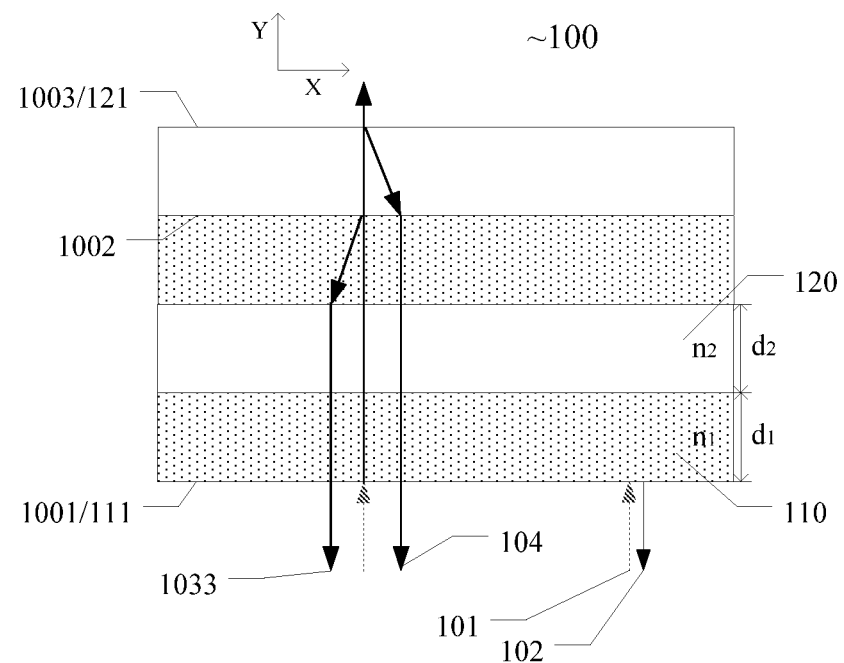
FIG. 1D is a schematic diagram illustrating a light filter structure and a working principle thereof in a light conversion structure according to further another example of an embodiment of the present disclosure.

For example, FIG. 1D is a schematic diagram illustrating a light filter structure and a working principle thereof in a light conversion structure according to further another example of an embodiment of the present disclosure. As illustrated in FIG. 1D, FIG. 1D is described with reference to the case where the light filter structure 100 includes two pairs of first optical film layers and second optical film layers arranged in a stacked manner, a surface of the first optical film layer 110 far away from the second optical film layer 120 is the light incident surface of the light filter structure 100, and refractive indices of mediums surrounding the two pairs of first optical film layers and second optical film layers are all smaller than refractive indices of the first optical film layer 110 and the second optical film layer, by way of example.

In this example, the optical path difference between the reflected light (excluding the first reflected light) and the first reflected light 102 upon the incident light 101 of first color being reflected by the light filter structure 100 as illustrated in FIG. 1C is an integer multiple of the wavelength of the incident light 101 of first color, so the optical path differences satisfy the following formulas:

$$2n_1d_1-(\lambda/2)=2k*(\lambda/2), k=1,2,3 \ldots;$$

$$2n_1d_1+2n_2d_2-(\lambda/2)=2k'*(\lambda/2), k'=1,2,3 \ldots;$$

$$4n_1d_1-3(\lambda/2)=2k''*(\lambda/2), k''=1,2,3 \ldots;$$

$$3n_2d_2+3n_1d_1-(\lambda/2)=2k'''*(\lambda/2), k'''=1,2,3 \ldots;$$

$$4n_2d_2+4n_1d_1=2k''''*(\lambda/2), k''''=1,2,3 \ldots.$$

The above formulas are only several main formulas in the case where the light filter structure includes two pairs of first optical film layers and second optical film layers, and there may be other formulas which are not enumerated here but can be deduced based on the previous analysis process.

In the case where the light filter structure includes more than two pairs of first optical film layers and second optical film layers, the formulas that the incident light of first color satisfies can be derived according to the above deducing process, without enumerated here.

For example, the incident light 101 of first color satisfying the above optical path difference has a wavelength in the range from 440 nm to 465 nm; that is, the incident light 101 of first color is blue light, which are included but not limited in this embodiment.

For example, the refractive index n1 of the first optical film layer 110 satisfying the above optical path difference is in the range from 1.2 to 1.8, the refractive index n1 of the second optical film layer 120 is in the range from 1.2 to 1.8, which are included but not limited in this embodiment.

For example, the first optical film layer 110 and the second optical film layer 120 may be composed of siloxane, organic resin or the like which is added with a metal oxide such as $TiO_2$ particle or added with an organic particle, and a diameter of the particle is between 10 nm and 50 nm, which are included but not limited in this embodiment.

For example, both of the first optical film layer 110 and the second optical film layer 120 satisfying the above optical path difference have a thickness in the range from 20 nm to 5000 nm.

For example, the thickness of each of the first optical film layer 110 and the second optical film layer 120 may be in the range from 145 nm to 363 nm.

Figure 1E:
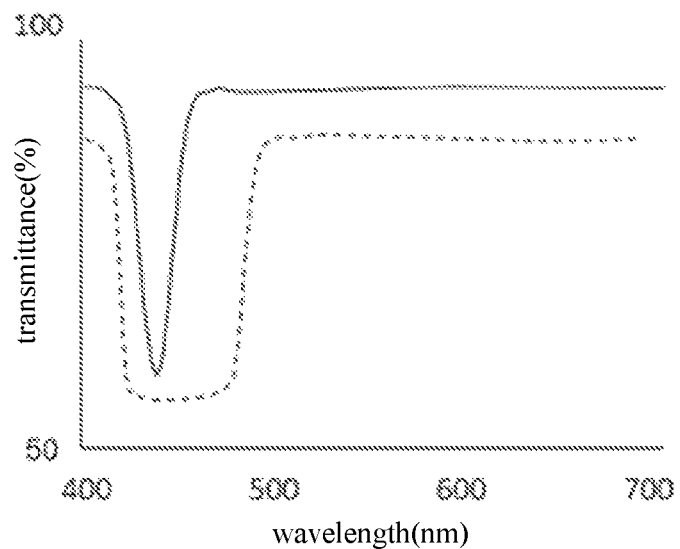
FIG. 1E is a schematic diagram illustrating a transmittance of white light at a light-exiting side of a light filter structure according to an embodiment of the present disclosure.

For example, FIG. 1E is a schematic diagram illustrating a transmittance of white light on a light-exiting side of a light filter structure provided by an embodiment of the present disclosure. As illustrated in FIG. 1E, a solid line refers to a transmittance of the incident light of first color at the light filter structure in the case where the light filter structure includes one pair of first optical film layer and second optical film layer, and a broken line refers to a transmittance of the incident light of first color at the light filter structure in the case where the light filter structure includes a plurality of pairs of first optical film layers and second optical film layers. As can be seen from FIG. 1E, when white light is incident into the light filter structure, a transmittance of the incident light of first color (i.e., the blue light waveband) is lower than that of the light in other wavebands; that is, the light filter structure can enhance a reflection effect of the incident light of first color.

For example, as illustrated in FIG. 1E, compared with a light filter structure including only one pair of first optical film layer and second optical film layer, a light filter structure including a plurality of pairs of first optical film layers and second optical film layers allows for a lower transmittance of the incident light of first color; that is, the light filter structure including the plurality of pairs of first optical film layers and second optical film layers provides a better reflection effect for the incident light of first color than the light filter structure including only one pair of first optical film layer and second optical film layer.

Figure 2A:
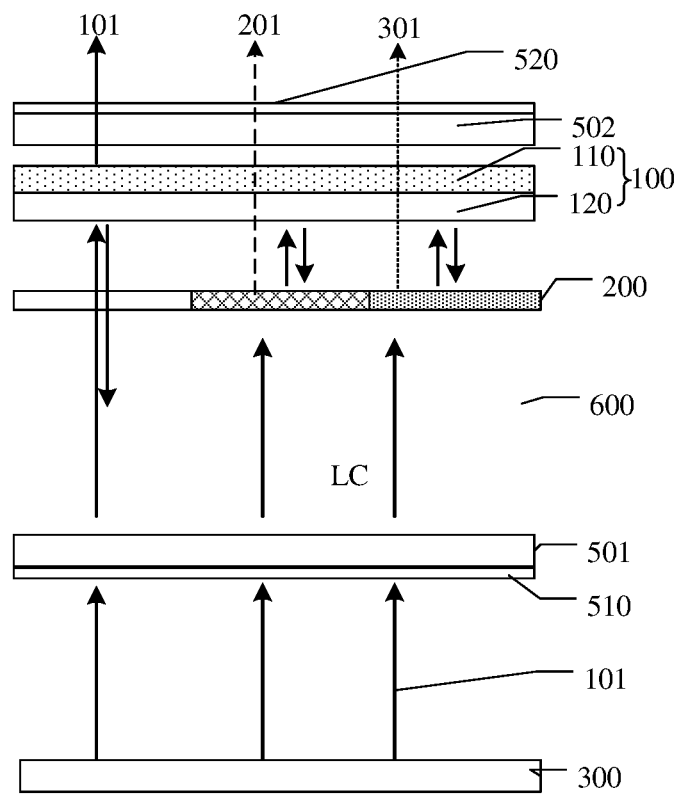
FIG. 2A is a partial structural diagram illustrating a display device including a light conversion structure according to an example of an embodiment of the present disclosure.

For example, FIG. 2A is a partial structural diagram illustrating a display device including a light conversion structure provided by an example of an embodiment of the present disclosure. As illustrated in FIG. 2A, the light conversion structure applied to a display device further includes a light conversion layer 200, and the light filter structure 100 is located at a light-exiting side of the light conversion layer 200; that is, the light exits from the light conversion layer 200 enters the light filter structure 100. This embodiment is described with reference to the case where the light conversion structure is a partial structure of a color filter substrate, by way of example. The light conversion layer 200 is configured to transmit a part of the incident light 101 of first color, and to allow another part of the incident light 101 of first color to pass through the light conversion layer 200 and exit as light of at least one other color; a wavelength of the incident light 101 of first color is smaller than a wavelength of the light of the other colors.

For example, a part of the incident light 101 of first color passes through the light conversion layer 200 and then exits as light 201 of second color and light 301 of third color.

For example, a material of the light conversion layer 200 includes a quantum dot material or a fluorescent material. Upon the incident light 101 of first color being incident onto the light conversion layer 200, the material of the light conversion layer 200 is excited by the incident light 101 of first color to emit light of other colors, for example, to emit light 201 of second color and light 301 of third color.

For example, the light 201 of second color that exits from the light conversion layer 200 further contains a part of the incident light 101 of first color which is mixed therein, and this part of the incident light 101 of first color may be reflected back into the light conversion layer 200 by the light filter structure 100 to continue to excite the material of the light conversion layer 200 to emit the light 201 of second color and the light 301 of third color. Therefore, the light filter structure provided by this embodiment can partly reflect the incident light of first color back into the light conversion layer, so that the incident light of first color passes through the material of the light conversion layer for multiple times to improve the utilization efficiency of the light-emitting material in the light conversion layer and reduce a usage amount of, for example, the quantum dot material (e.g., achieving a lower concentration, or matching with a light conversion layer having smaller thickness), thereby overcoming the problem of concentration limit of the quantum dot material. At the same time, with the same color gamut, a cost of the quantum dot material and an environmental pollution can be reduced. In addition, in the case where the incident light of first color is blue light, the light extraction rate of the blue light in the display device may also be reduced in this embodiment, thereby improving a visual experience of a user.

For example, in the manufacturing process, a first refractive index matching material layer (first optical film layer) with a predetermined thickness may be manufactured on a substrate by using a spin coating process, and the first refractive index matching material layer is subjected to a pre-baking process (70° C. to 150° C., 1 to 30 minutes) to be initially fixed. Then, a second refractive index matching material layer (second optical film layer) is manufactured on a side of the first refractive index matching material layer far away from the substrate by using a spin coating process, and the second refractive index matching material layer is subjected to a pre-baking process and a post-baking process (70° C. to 250° C., 1 to 30 minutes), sequentially, to be shaped. The control of values of the refractive index and the thickness of the first optical film layer and the second optical film layer follows the value range given by the above examples. Moreover, the light filter structure can also include one or more pair of first optical film layer and second optical film layer according to different requirements, without limited in this embodiment. For example, the light filter structure can include two, three or more pairs of first optical film layers and second optical film layers.

For example, as illustrated in FIG. 2A, the display device provided by this example further includes a backlight module 300, a first polarizer 510, a first substrate 501, a second polarizer 520, a second substrate 502, and a liquid crystal layer 600. This example is described with reference to the case where the display device is a liquid crystal display device, by way of example, without limited thereto, and may also be, for example, an electroluminescence display device or the like.

For example, as illustrated in FIG. 2A, upon the part of the incident light 101 of first color that is transmitted being reflected by the light filter structure 100, the reflected light is returned to the liquid crystal layer 600 and/or the backlight module 300; the reflected light may change its propagation direction in the liquid crystal layer 600 and/or backlight module 300, and is incident onto the light conversion layer 200, again, thereby further improving the utilization of the incident light of first color.

For example, the incident light 101 of first color may be blue light, the light 201 of second color may be green light, and the light 301 of third color may be red light, which are included but not limited in this embodiment. For example, the light of second color and the light of third color may be interchanged in this embodiment.

Figure 2B:
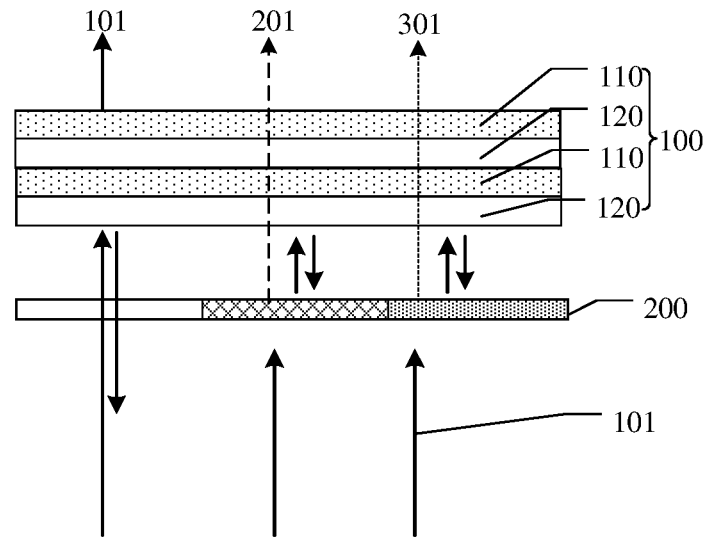
FIG. 2B is a partial structural diagram illustrating a light conversion structure according to another example of an embodiment of the present disclosure.

For example, FIG. 2B is a partial structural diagram illustrating a light conversion structure provided by another example of an embodiment of the present disclosure. As illustrated in FIG. 2B, the light filter structure 100 in this example includes two pairs of first optical film layers and second optical film layers, which is included but not limited in this example. For example, the light filter structure 100 may further include three or more pairs of first optical film layers and second optical film layers.

Figure 3:
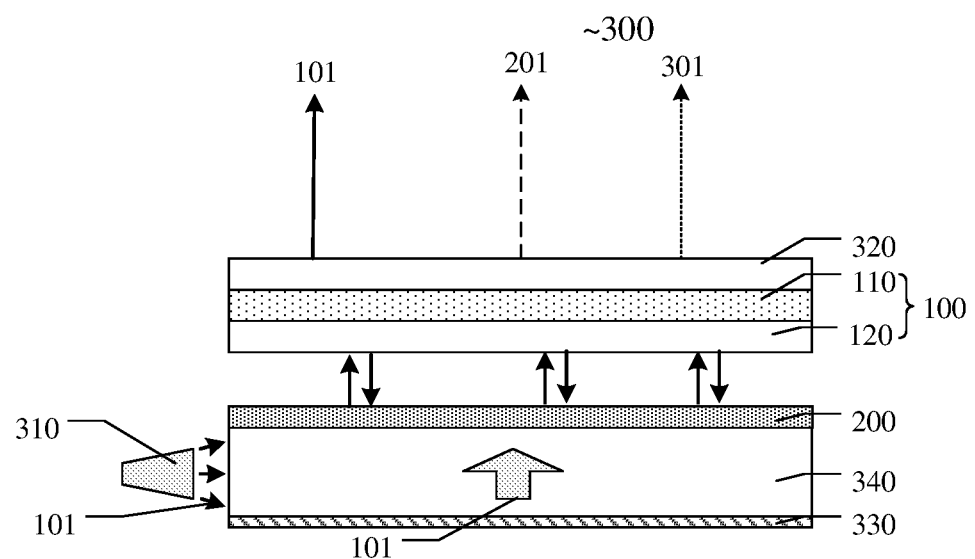
FIG. 3 is a partial structural diagram illustrating a backlight module including a light conversion structure according to an embodiment of the present disclosure.

Another embodiment of the present disclosure provides a backlight module. FIG. 3 is a partial structural diagram illustrating a backlight module including a light conversion structure provided by an embodiment of the present disclosure. The backlight module provided by this embodiment includes the light filter structure provided by any of the above embodiments. As illustrated in FIG. 3, the backlight module 300 includes: a light source 310, a light conversion structure applied to a display device and located on a light-exiting side of the light source 310, and a light adjustment structure 320. The light adjustment structure 320 is located on a light-exiting side of the light conversion structure to extract light uniformly. The light emitted from the light source 310 is the incident light 101 of first color.

This embodiment is described with reference to the case where the backlight module 300 is an edge-type backlight module, by way of example. However, the embodiment is not limited thereto. For example, the backlight module may also be a direct-lit type backlight module.

For example, as illustrated in FIG. 3, the backlight module 300 further includes a light guide plate 340 and a reflective layer 330 located at a side of the light guide plate 340 far away from the light conversion layer 200.

In this embodiment, the light-exiting side of the light source 310 refers to a light-exiting side of the light guide plate 340, the incident light 101 of first color that is emitted from the light source 310 enters the light guide plate 340 and then exits through the light-exiting side of the light guide plate 340.

For example, as illustrated in FIG. 3, the light adjustment structure 320 may include a diffusion layer (not illustrated) configured to diffuse light, a prism layer (not illustrated) configured to gather light, and other film layers, without limited in this embodiment.

For example, as illustrated in FIG. 3, the light conversion structure further includes a light conversion layer 200 located between the light filter structure 100 and the light source 310. The light conversion layer 200 is configured to transmit a part of the incident light 101 of first color, and to allow another part of the incident light 101 of first color to pass through the light conversion layer 200 and then exit as light of at least one other color; and the wavelength of the incident light 101 of first color is smaller than a wavelength of light of other colors.

For example, the light conversion layer includes a quantum dot material or a fluorescent material.

For example, as illustrated in FIG. 3, light of other colors includes at least one of light 201 of second color and light 301 of third color; and the light conversion layer 200 includes at least one of a quantum dot material of second color and a quantum dot material of third color so that the incident light 101 of first color can exit as at least one of the light 201 of second color and the light 301 of third color upon passing through the light conversion layer 200.

For example, the quantum dot material is a mixed quantum dot material, and the mixed quantum dot material includes a mixture of a quantum dot material of second color and a quantum dot material of third color so that the incident light 101 of first color can exit as light 201 of second color and light 301 of third color upon passing through the light conversion layer 200.

This embodiment is described with reference to the case where the quantum dot material of second color and the quantum dot material of third color are a red quantum dot material and a green quantum dot material, respectively, the entire light conversion layer is a quantum dot layer, the quantum dot layer is a mixture of red quantum dot material and green quantum dot material, and the incident light of first color is blue light, by way of example. A part of the blue incident light passes through a gap between quantum dots to exit as blue light through the light conversion layer, and another part of the blue incident light excites the quantum dot material to emit red light and green light.

This embodiment is not limited thereto. For example, the incident light of first color may also be blue light, and the light of other colors includes only yellow light; that is, the incident light of first color excites the quantum dot material to emit yellow light, and the blue light and the yellow light are mixed to form white light.

Because the light 201 of second color and the light 301 of third color contain a part of the incident light 101 of first color mixed therein, respectively, the incident light 101 of first color is partly returned to the quantum dot material of the light conversion layer to be utilized for several times upon the light 201 of second color and the light 301 of third color containing a part of the incident light 101 of first color mixed therein respectively passing through the light filter structure 100, so that the usage amount of, for example, the quantum dot material (for example, achieving a lower concentration, or matching with a light conversion layer having smaller thickness) is reduced, thereby overcoming the problem of concentration limit of the quantum dot material. At the same time, with the same color gamut, the cost of quantum dot material and the environmental pollution can be reduced.

Compared with a conventional backlight module, the backlight module using the light conversion structure provided by the embodiment produces white light of wide color gamut, because the white light is generated by exciting, for example, the quantum dot material in the light conversion layer.

Figure 4:
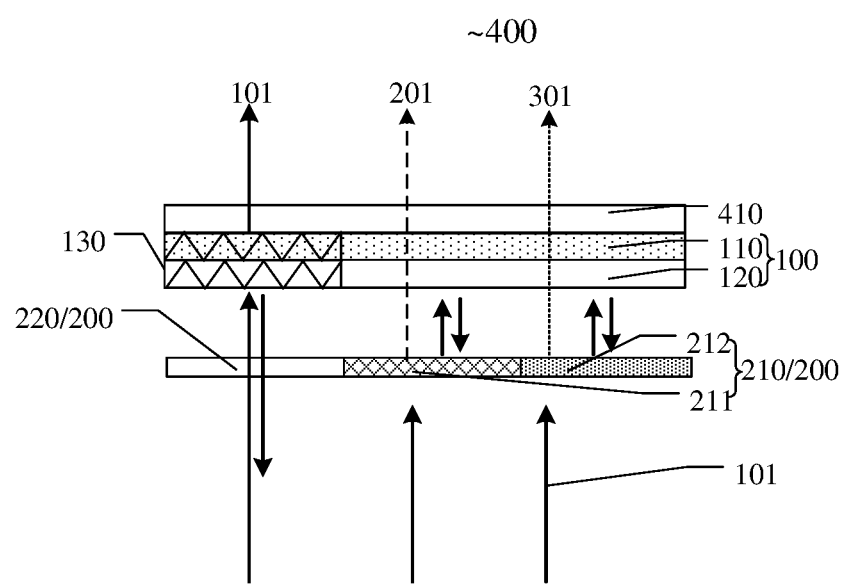
FIG. 4 is a partial structural diagram illustrating a color filter substrate including a light conversion structure according to an embodiment of the present disclosure.

Another embodiment of the present disclosure provides a color filter substrate. FIG. 4 is a partial structural diagram illustrating a color filter substrate including a light conversion structure provided by an embodiment of the present disclosure. This embodiment includes the light filter structure provided by any of the above embodiments. As illustrated in FIG. 4, the color filter substrate 400 provided by this embodiment includes a base substrate 410 and a light conversion structure located on the base substrate 410. The light conversion structure further includes a color filter layer 200 located at a light incident side of the light filter structure 100; the color filter layer 200 includes a light conversion portion 210 and a light transmission portion 220. The light transmission portion 220 is configured to directly transmit the incident light 101 of first color. The light conversion portion 210 is configured to emit light of at least one other color upon the incident light 212 of first color passing through the light conversion portion 210. The wavelength of the incident light 101 of first color is smaller than a wavelength of light of the other colors. Here, "directly transmit" refers to that the incident light 101 of first color exits the light transmission portion 220 still as light of first color.

In this embodiment, light of different colors emitted from the color filter layer 200 corresponds to sub-pixels of different colors, respectively; that is, the light transmission portion 220 and the light conversion portion 210 correspond to sub-pixels of different colors, respectively.

For example, the light conversion portion includes a quantum dot material or a fluorescent material.

For example, as illustrated in FIG. 4, the light conversion portion 210 includes a first light conversion portion 211 and a second light conversion portion 212. The first light conversion portion 211 is configured to allow the incident light 101 of first color to exit as light 201 of second color upon passing through the first light conversion portion 211. The second light conversion portion 212 is configured to allow the incident light 101 of first color to exit as light 301 of third color upon passing through the second light conversion portion 212. That is, the quantum dot material includes a quantum dot material of second color and a quantum dot material of third color, so as to allow the incident light 101 of first color to exit as the light 201 of second color and the light 301 of third color, respectively, upon passing through the light conversion portion 210, respectively.

For example, as illustrated in FIG. 4, the light filter structure 100 includes a hollowed-out structure 130, and an orthographic projection of the hollowed-out structure 130 on the color filter layer 200 falls within an orthographic projection of the light transmission portion 220 on the color filter layer 200. For example, the hollowed-out structure 130 can be manufactured by using a mask process.

For example, as illustrated in FIG. 4, the light filter structure 100 may be located between the base substrate 410 and the color filter layer 200. In this case, the incident light 101 of first color passes through the color filter layer 200, the light filter structure 100, and the base substrate 410 in sequence, which is included but not limited in this embodiment. For example, the color filter layer may also be located between the light filter structure and the base substrate, and the incident light of first color passes through the base substrate, the color filter layer, and the light filter structure in sequence.

For example, as illustrated in FIG. 4, the incident light 101 of first color passes through the light transmission portion 220 of the color filter layer 200 and then is incident into the light filter structure 100. The light filter structure 100 transmits a part of the incident light 101 of first color and reflects another part of the incident light 101 of first color, so that an extraction intensity of the incident light 101 of first color can be reduced as much as possible. In addition, a part of the incident light 101 of first color that is reflected may be returned to the liquid crystal layer and/or the backlight module of the display device; this part of the incident light 101 of first color may change its propagation direction in the liquid crystal layer and/or the backlight module, and is incident into the color filter layer 200 again, thereby improving the utilization ratio of the incident light of first color.

For example, as illustrated in FIG. 4, the incident light 101 of first color passes through the first light conversion portion 211 and then exits as the light 201 of second color; and the incident light 101 of first color passes through the second light conversion portion 212 and then exits as the light 301 of third color. The light 201 of second color and the light 301 of third color that exit from the color filter layer 200 further contain a part of the incident light 101 of first color mixed therein, respectively; and this part of the incident light 101 of first color has a portion which is reflected back to the light conversion portion 210 by the light filter structure 100, so as to continue to excite the material of the light conversion portion 210 to emit light 201 of second color and light 301 of third color. In this way, the light filter structure provided by this embodiment can reflect a part of the incident light of first color back to the color filter layer, so that the incident light of first color passes through a material of the light conversion portion for multiple times to improve the utilization efficiency of the light-emitting material in the light conversion portion and reduce the usage amount of, for example, the quantum dot material (e.g., achieving a lower concentration, or matching with a light conversion layer having smaller thickness), thereby overcoming the problem of concentration limit of the quantum dot material. At the same time, with the same color gamut, the cost of quantum dot material and the environmental pollution can be reduced.

For example, the light filter structure 100 can be manufactured to include one or more pair of first optical film layer and second optical film layer according to different requirements, which is not limited in this embodiment.

For example, the light filter structure can include two, three or more pairs of first optical film layers and second optical film layers.

Another embodiment of the present disclosure provides a display device, which includes the light conversion structure provided by any of the above embodiments. The display device can partly reflect the incident light of first color back to the light conversion layer, so that the incident light of first color passes through a material in the light conversion layer for multiple times to improve the utilization efficiency of the light-emitting material in the light conversion layer and to reduce the usage amount of, for example, the quantum dot material (e.g., achieving a lower concentration, or matching with an optical conversion layer having smaller thickness), thereby overcoming the problem of concentration limit of the quantum dot material. At the same time, with the same color gamut, the cost of quantum dot material and the environmental pollution can be reduced.

For example, the display device may be a display device such as a liquid crystal display device, an organic light-emitting diode (OLED) display device, and a product or a component having a display function such as a television, a digital camera, a mobile phone, a watch, a tablet computer, a notebook computer, and a navigation device. This embodiment is not limited thereto.

The following statements should be noted:

(1) Unless otherwise defined, the same reference numeral refers to the same meaning in the embodiments and the accompanying drawings of the present disclosure.

(2) The accompanying drawings involve only the structure(s) in connection with the embodiment(s) of the present disclosure, and other structure(s) can be referred to common design(s).

(3) For the purpose of clarity only, in accompanying drawings for illustrating the embodiment(s) of the present disclosure, a layer or an area may be enlarged. It should be understood that, in the case in which a component such as a layer, film, area, substrate or the like is referred to be "on" or "under" another component, it may be directly on or under the another component or a component is interposed therebetween.

The above are only specific implementations of the present disclosure, and the protection scope of the present disclosure is not limited thereto. Any changes or substitutions easily occur to those skilled in the art within the technical scope of the present disclosure should be covered in the protection scope of the present disclosure. Therefore, the protection scope of the present disclosure should be based on the protection scope of the claims.

What is claimed is:

1. A light conversion structure, comprising:
a light filter structure comprising a first optical film layer and a second optical film layer which are alternately arranged and attached to each other, a total number of the first optical film layer and the second optical film layer being N, wherein N is an even number, and a refractive index of the first optical film layer is greater than that of the second optical film layer, one of a surface of the first optical film layer far away from the second optical film layer and a surface of the second optical film layer far away from the first optical film layer is a light incident surface of the light filter structure, and the other one of the surface of the first optical film layer far away from the second optical film layer and the surface of the second optical film layer far away from the first optical film layer is a light-exiting surface of the light filter structure, wherein a part of an incident light of first color that is reflected by the light incident surface is a first reflected light, a part of the incident light of first color that is reflected by an interface between the first optical film layer and the second optical film layer is a second reflected light, and an optical path difference between the first reflected light and the second reflected light is an integer multiple of a wavelength of the incident light of first color, the light filter structure comprises one pair of first optical film layer and second optical film layer, the first optical film layer has a refractive index of n1 and a thickness of d1, and the second optical film layer has a refractive index of n2 and a thickness of d2, the incident light of first color has a wavelength of λ, when the light incident surface is the surface of the second optical film layer far away from the first optical film layer, the incident light of first color satisfies the following formulas upon being incident into the light filter structure:

$2n_2 d_2 = 2k*(\lambda/2), k=1,2,3 \ldots;$ $2n_2 d_2 + 2n_1 d_1 - (\lambda/2) = 2k'*(\lambda/2), k'=1,2,3 \ldots;$ $4n_2 d_2 = 2k''*(\lambda/2), k''=1,2,3 \ldots,$ when the light incident surface is the surface of the first optical film layer far away from the second optical film layer, the incident light of first color satisfies the following formulas upon being incident into the light filter structure:

$2n_1 d_1 - (\lambda/2) = 2k*(\lambda/2), k=1,2,3 \ldots;$ $2n_1 d_1 + 2n_2 d_2 = 2k'*(\lambda/2), k'=1,2,3 \ldots;$ $4n_1 d_1 - 3(\lambda/2) = 2k''*(\lambda/2), k''=1,2,3 \ldots.$ 2. The light conversion structure according to claim 1, wherein a part of the incident light of first color that is reflected by a side of the light-exiting surface facing the interface is a third reflected light, and an optical path difference between the first reflected light and the third reflected light is an integer multiple of the wavelength of the incident light of first color.

3. The light conversion structure according to claim 1, wherein the incident light of first color has a wavelength in the range from 440 nm to 465 nm.

4. The light conversion structure according to claim 1, wherein both of the first optical film layer and the second optical film layer have a refractive index in the range from 1.2 to 1.8.

5. The light conversion structure according to claim 1, wherein both of the first optical film layer and the second optical film layer have a thickness in the range from 20 nm to 5000 nm.

6. The light conversion structure according to claim 1, wherein both of the first optical film layer and the second optical film layer are made of at least one material selected from the group consisting of a siloxane added with a titanium oxide particle and an organic resin added with a titanium oxide particle.

7. The light conversion structure according to claim 1, further comprising:
a light conversion layer configured to transmit a part of the incident light of first color, and to allow another part of the incident light of first color light to exit as light of at least one other color upon passing through the light conversion layer, a wavelength of the incident light of first color being less than a wavelength of light of the other color, wherein
the light filter structure is on a light-exiting side of the light conversion layer.

8. The light conversion structure according to claim 7, wherein the light conversion layer comprises a quantum dot material or a fluorescent material.

9. A backlight module comprising:
a light source;
the light conversion structure according to claim 7, the light conversion structure being located on a light-exiting side of the light source, wherein
light emitted from the light source is the incident light of first color.

10. The backlight module according to claim 9, wherein the light conversion layer comprises a quantum dot material.

11. The backlight module according to claim 10, wherein the quantum dot material is a mixed quantum dot material, the mixed quantum dot material comprising a mixture of a quantum dot material of second color and a quantum dot material of third color to allow the incident light of first color to exit as light of second color and light of third color upon passing through the light conversion layer.

12. The backlight module according to claim 9, further comprising:
a light adjustment structure on a side of the light conversion structure far away from the light source to extract light uniformly.

13. A color filter substrate comprising the light conversion structure according to claim 1, wherein
the light conversion structure further comprises a color filter layer located on a light incident side of the light filter structure, the color filter layer comprises a light conversion portion and a light transmission portion, the light transmission portion is configured to directly transmit the incident light of first color, the light conversion portion is configured to allow the incident light of first color to exit as light of at least one other color upon passing through the light conversion portion, a wavelength of the incident light of first color is smaller than a wavelength of the light of other color, and the light conversion portion comprises a quantum dot material.

14. The color filter substrate according to claim 13, wherein the quantum dot material comprises a quantum dot material of second color and a quantum dot material of third color to allow the incident light of first color to exit as light of second color and light of third color upon passing through the light conversion portion.

15. The color filter substrate according to claim 13, wherein the light filter structure comprises a hollowed-out structure, and an orthographic projection of the hollowed-out structure on the color filter layer falls within an orthographic projection of the light transmission portion on the color filter layer.

16. A display device comprising the light conversion structure according to claim 1.

* * * * *